United States Patent
Yi et al.

(10) Patent No.: US 12,150,198 B2
(45) Date of Patent: *Nov. 19, 2024

(54) METHOD AND USER EQUIPMENT FOR TRANSMITTING UPLINK SIGNALS

(71) Applicant: LG Electronics Inc., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/495,091

(22) Filed: Oct. 6, 2021

(65) Prior Publication Data

US 2022/0030660 A1   Jan. 27, 2022

Related U.S. Application Data

(63) Continuation of application No. 16/335,391, filed as application No. PCT/KR2017/012246 on Nov. 1, 2017, now Pat. No. 11,706,837.

(Continued)

(51) Int. Cl.
*H04W 76/27* (2018.01)
*H04W 4/70* (2018.01)
(Continued)

(52) U.S. Cl.
CPC ............. *H04W 76/27* (2018.02); *H04W 4/70* (2018.02); *H04W 72/1268* (2013.01); *H04W 72/23* (2023.01); *H04W 74/006* (2013.01); *H04W 74/0833* (2013.01); *H04W 56/00* (2013.01); *H04W 74/04* (2013.01)

(58) Field of Classification Search
CPC ... H04W 76/27; H04W 4/70; H04W 72/1268; H04W 72/14; H04W 74/006; H04W 74/0833; H04W 56/00; H04W 74/04
See application file for complete search history.

(56) References Cited

U.S. PATENT DOCUMENTS 8,274,936 B2    9/2012  Yoo
8,312,336 B2 *  11/2012 Chun ................... H04L 1/1874
                                                  714/748

(Continued)

FOREIGN PATENT DOCUMENTS

JP       2014514831 A    6/2014

OTHER PUBLICATIONS

InterDigital Communications, "UE Transmissions in New State for NR", 3GPP TSG-RAN WG2 #95bis, Oct. 10-14, 2016, R2-166870.

(Continued)

*Primary Examiner* — Nishant Divecha
(74) *Attorney, Agent, or Firm* — BRYAN CAVE LEIGHTON PAISNER LLP

(57) ABSTRACT

In the present invention, a user equipment (UE) receives an UL grant that can be used while the UE is not in RRC_CONNECTED state. If the UE receives a message indicating to leave RRC_CONNECTED state, the UE starts a time alignment timer (I-TAT) when the UE leaves RRC_CONNECTED state. The UE transmits UL data using the UL grant if the UL data becomes available for transmission when the UE is not in RRC_CONNECTED state and if the I-TAT is running.

9 Claims, 7 Drawing Sheets

Related U.S. Application Data

(60) Provisional application No. 62/417,349, filed on Nov. 4, 2016.

(51) Int. Cl.
| | | |
|---|---|---|
| *H04W 56/00* | (2009.01) | |
| *H04W 72/1268* | (2023.01) | |
| *H04W 72/23* | (2023.01) | |
| *H04W 74/00* | (2009.01) | |
| *H04W 74/08* | (2009.01) | |
| *H04W 74/0833* | (2024.01) | |
| *H04W 74/04* | (2009.01) | |

(56) References Cited

U.S. PATENT DOCUMENTS

| | | | |
|---|---|---|---|
| 8,867,455 B2 | 10/2014 | Sambhwani | |
| 8,964,793 B2* | 2/2015 | Jang | H04W 28/04 |
| | | | 455/181.1 |
| 9,059,848 B2* | 6/2015 | Larmo | H04L 1/1854 |
| 9,143,970 B2* | 9/2015 | Park | H04W 24/10 |
| 9,591,600 B2 | 3/2017 | Lee et al. | |
| 9,781,690 B2 | 10/2017 | Parkvall | |
| 9,992,791 B2* | 6/2018 | Zhang | H04W 72/04 |
| 10,306,596 B2* | 5/2019 | Baghel | H04L 67/52 |
| 10,356,837 B2 | 7/2019 | Chen | |
| 10,652,899 B2 | 5/2020 | Hu | |
| 10,687,354 B2* | 6/2020 | Li | H04W 52/325 |
| 10,856,257 B2 | 12/2020 | Lee | |
| 2013/0188612 A1 | 7/2013 | Dinan | |
| 2013/0242953 A1 | 9/2013 | Malkamaki et al. | |
| 2013/0308545 A1* | 11/2013 | Lee | H04W 76/10 |
| | | | 370/328 |
| 2014/0269637 A1 | 9/2014 | Banister et al. | |
| 2016/0088622 A1 | 3/2016 | Dinan | |
| 2016/0295537 A1 | 10/2016 | Langereis | |
| 2017/0055301 A1* | 2/2017 | Choi | H04W 76/11 |
| 2018/0206262 A1 | 7/2018 | Cao et al. | |

OTHER PUBLICATIONS

LG Electronics Inc., "Discussion on functionality considering RRC-Inactive state", 3GPP TSG-RAN WG3 Meeting #93, Aug. 22-26, 2016, R3-161931.

LTE-A Timing Advance by Bansal, published Jul. 21, 2015 retrieved from http://lteforgeeks.blogspot.com/2015/07/timing-advance-for-lte-a.html#:~:text=1.,restart%20the%20Time%20Alignment%20Timer.&text=Timing%20command%20is%206%20bit%20value%20ranging%20from%200%2D63. (Year: 2015).

LTE: timing advance and time alignment timer by Swamy, published in 2014, retrieved from http://howltestuffworks.blogspot.com/2014/07/timing-advance-and-time-alignment-timer.html (Year: 2014).

Time Advance and Time Alignment Timer by Pasupuleti, dated Jul. 2, 2014, retrieved Aug. 8, 2015 using http://web.archive.org/web/20150808201910/https://howltestuffworks.blogspot.com/2014/07/timing-advance-and-time-alignment-timer.html (Year: 2015).

ZTE, "Discussion on full solution A", 3GPP TSG-RAN WG2 #97, R2-1701931, Athens, Greece, Feb. 13-17, 2017.

\* cited by examiner

FIG. 4
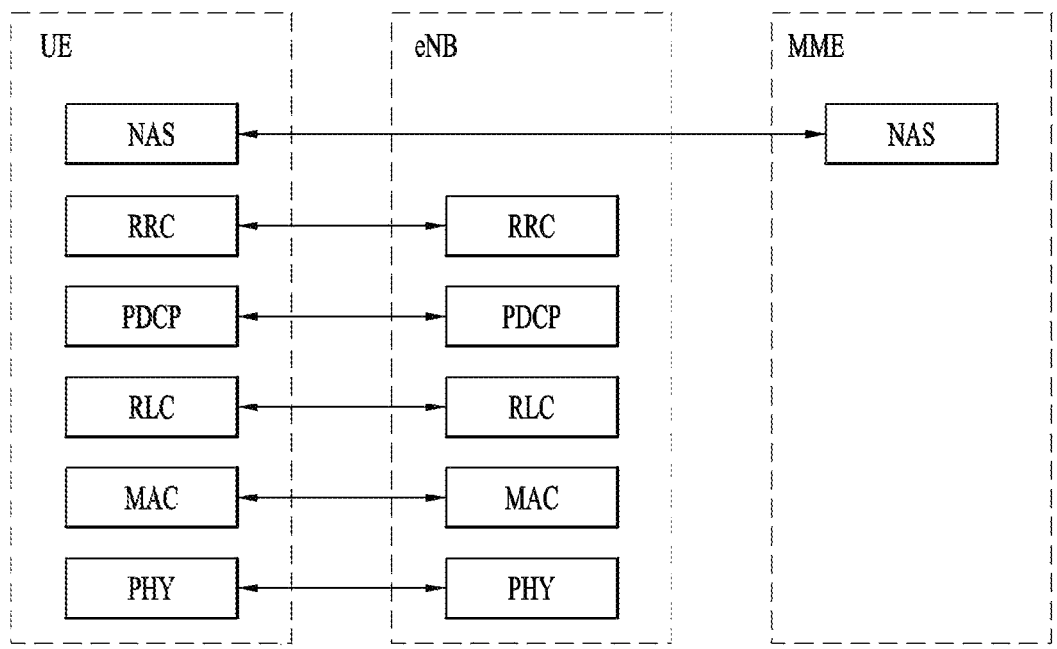
(a) Control-Plane Protocol Stack
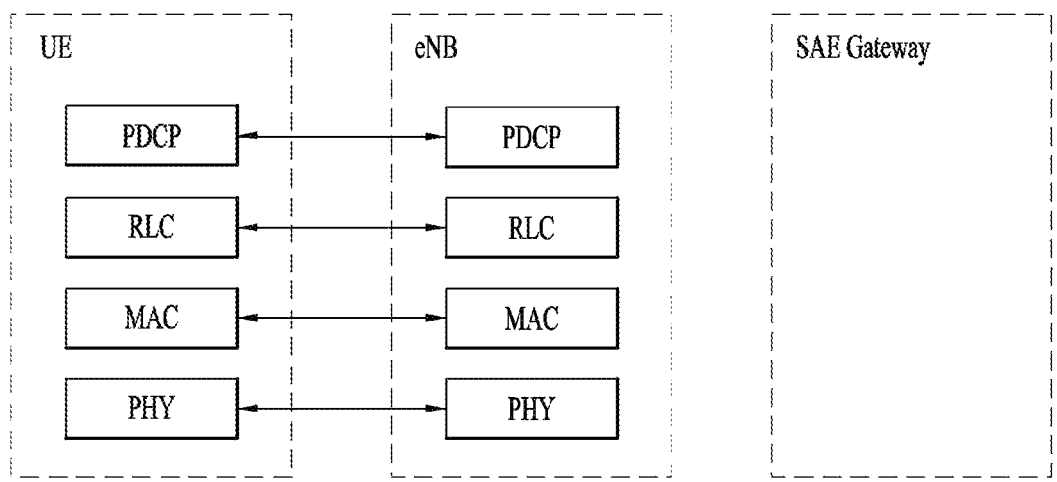
(b) User-Plane Protocol Stack

METHOD AND USER EQUIPMENT FOR TRANSMITTING UPLINK SIGNALS

This application is a continuation application of U.S. patent application Ser. No. 16/335,391 filed Mar. 21, 2019, which is a National Stage Entry of International Application No. PCT/KR2017/012246 filed Nov. 1, 2017, which claims priority to U.S. Provisional Application No. 62/417,349 filed Nov. 4, 2016, all of which are incorporated herein by reference.

TECHNICAL FIELD

The present invention relates to a wireless communication system, and more particularly, to a method for transmitting uplink signals and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

In an aspect of the present invention, provided herein is a method of transmitting, by a user equipment (UE), uplink (UL) signals in a wireless communication system. The method comprises: receiving, by the UE, an UL grant that can be used while the UE is not in RRC_CONNECTED state; receiving, by the UE, a message indicating to leave RRC_CONNECTED state; starting, by the UE, a time alignment timer (I-TAT) when the UE leaves RRC_CONNECTED state; and transmitting, by the UE, UL data using the UL grant if the UL data becomes available for transmission when the UE is not in RRC_CONNECTED state and if the I-TAT is running In another aspect of the present invention, provided herein is a user equipment (UE) for transmitting uplink (UL)

signals in a wireless communication system. The UE comprises a radio frequency (RF) unit, and a processor configured to control the RF unit. The processor is configured to control the RF unit to receive an UL grant that can be used while the UE is not in RRC_CONNECTED state; control the RF unit to receive a message indicating to leave RRC_CONNECTED state; start a time alignment timer (I-TAT) when the UE leaves RRC_CONNECTED state; and control the RF unit to transmit UL data using the UL grant if the UL data becomes available for transmission when the UE is not in RRC_CONNECTED state and if the I-TAT is running In each aspect of the present invention, if the UL data becomes available for transmission when the UE is not in RRC_CONNECTED state and if the I-TAT is not running, the UE may initiate a random access (RA) procedure.

In each aspect of the present invention, the UE may receive an indication to restart the I-TAT via system information. The UE may restart the I-TAT if receiving the indication.

In each aspect of the present invention, the I-TAT may be a duration where the UE considers that UL timing is synchronized while the UE is not in RRC_CONNECTED state.

In each aspect of the present invention, the UE's leaving RRC_CONNECTED state may be the UE's entering RRC_INACTIVE state.

In each aspect of the present invention, the UL data may be transmitted with an identity of the UE using the UL grant when the UE is not in RRC_CONNECTED state.

In each aspect of the present invention, the UE may stop the I-TAT when the UE enters RRC_CONNECTED state.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduced.

Also, it is possible to efficiently transmit/receive a small amount of data for smart devices, or efficiently transmit/receive data occurring at a low frequency.

Also, signals in a new radio access technology system can be transmitted/received effectively.

According to an embodiment of the present invention, a small amount of data may be efficiently transmitted/received.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 4 is a diagram showing a control plane and a user plane of a radio interface protocol between a UE and an E-UTRAN based on a 3GPP radio access network standard.

MODE FOR INVENTION

Figure 1:
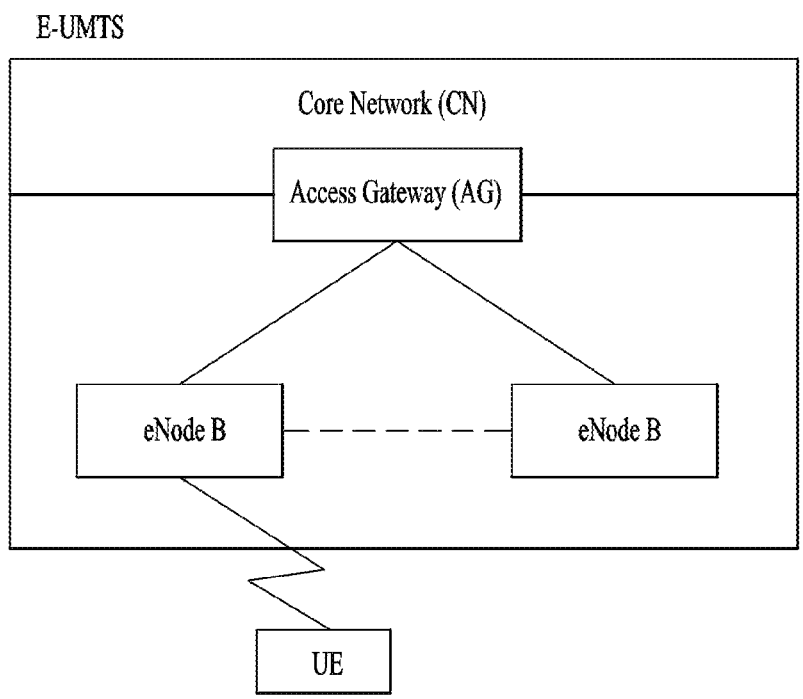
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi- Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

In the present invention, "PDCCH" refers to a PDCCH, a EPDCCH (in subframes when configured), a MTC PDCCH (MPDCCH), for an RN with R-PDCCH configured and not suspended, to the R-PDCCH or, for NB-IoT to the narrowband PDCCH (NPDCCH).

In the present invention, for dual connectivity operation the term "special Cell" refers to the PCell of the master cell group (MCG) or the PSCell of the secondary cell group (SCG), otherwise the term Special Cell refers to the PCell. The MCG is a group of serving cells associated with a master eNB (MeNB) which terminates at least S1-MME, and the SCG is a group of serving cells associated with a secondary eNB (SeNB) that is providing additional radio resources for the UE but is not the MeNB. The SCG is comprised of a primary SCell (PSCell) and optionally one or more SCells. In dual connectivity, two MAC entities are configured in the UE: one for the MCG and one for the SCG. Each MAC entity is configured by RRC with a serving cell supporting PUCCH transmission and contention based Random Access. In this specification, the term SpCell refers to such cell, whereas the term SCell refers to other serving cells. The term SpCell either refers to the PCell of the MCG or the PSCell of the SCG depending on if the MAC entity is associated to the MCG or the SCG, respectively.

In the present invention, "C-RNTI" refers to a cell RNTI, "G-RNTI" refers to a group RNTI, "P-RNTI" refers to a paging RNTI, "RA-RNTI" refers to a random access RNTI, "SC-RNTI" refers to a single cell RNTI", "SL-RNTI" refers to a sidelink RNTI, and "SPS C-RNTI" refers to a semi-persistent scheduling C-RNTI.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.300, 3GPP TS 36.321, 3GPP TS 36.322, 3GPP TS 36.323 and 3GPP TS 36.331 may be referenced.

Figure 2:
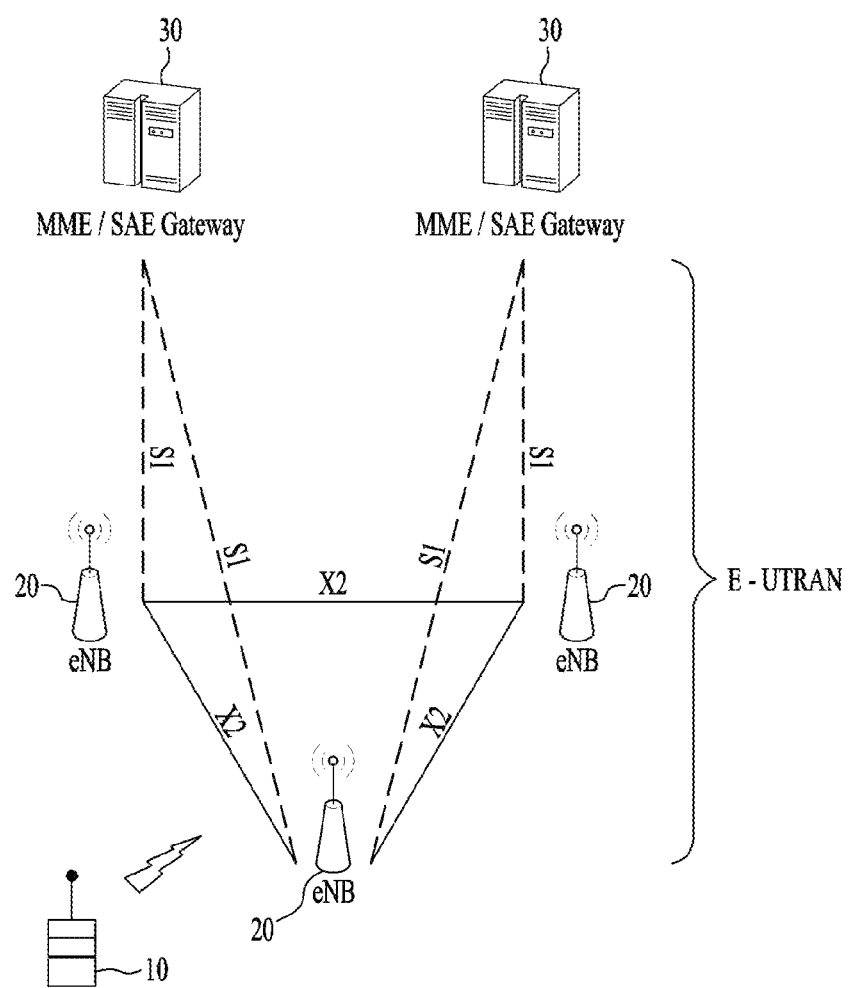
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
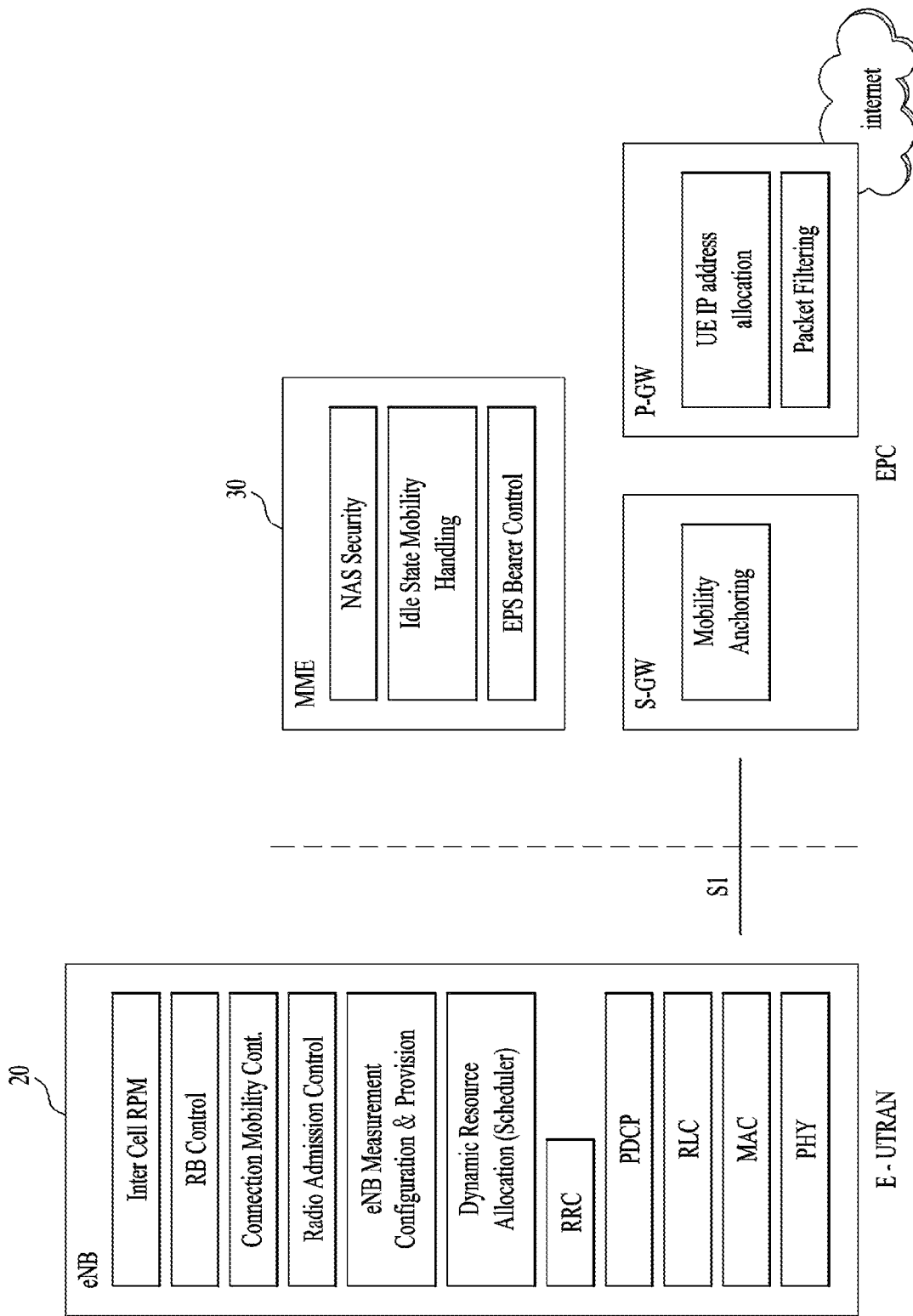
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an Si interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the LTE/LTE-A system is corresponding to a physical layer. A physical (PHY) layer of a first layer (Layer 1 or L1) provides an information transfer service to a higher layer using a physical channel The PHY layer is connected to a medium access control (MAC) layer located on the higher layer via a transport channel Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the LTE/LTE-A system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

Layer 3 (i.e. L3) of the LTE/LTE-A system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. The non-access stratum (NAS) layer positioned over the RRC layer performs functions such as session management and mobility management.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
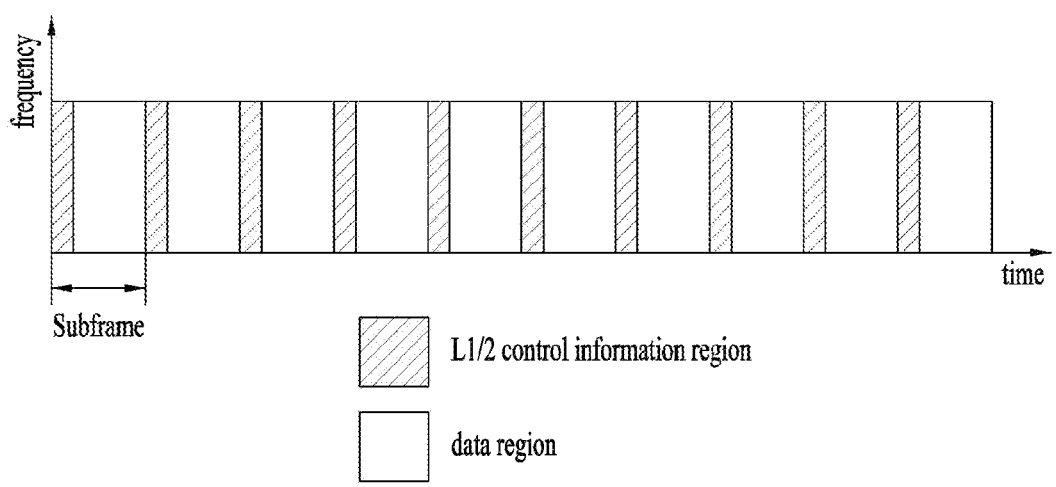
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID). The UE having finished initial cell search may perform the random access procedure to complete access to the eNB. To this end, the UE may transmit a preamble through a physical random access channel (PRACH), and receive a response message which is a response to the preamble through a PDCCH and PDSCH. In the case of contention-based random access, transmission of an additional PRACH and a contention resolution procedure for the PDCCH and a PDSCH corresponding to the PDCCH may be performed. After performing the procedure described above, the UE may perform PDCCH/PDSCH reception and PUSCH/PUCCH transmission as a typical procedure of transmission of an uplink/downlink signal.

The random access procedure is also referred to as a random access channel (RACH) procedure. The random access procedure is common procedure for FDD and TDD, and one procedure irrespective of cell size and the number of serving cells when carrier aggregation (CA) is configured. The random access procedure is used for various purposes including initial access, adjustment of uplink synchronization, resource assignment, and handover. Random access procedures are classified into a contention-based procedure and a dedicated (i.e., non-contention-based) procedure. The contention-based random access procedure is used for general operations including initial access, while the dedicated random access procedure is used for limited operations such as handover. In the contention-based random access procedure, the UE randomly selects a RACH preamble sequence. Accordingly, it is possible that multiple UEs transmit the same RACH preamble sequence at the same time. Thereby, a contention resolution procedure needs to be subsequently performed. On the other hand, in the dedicated random access procedure, the UE uses an RACH preamble sequence that the eNB uniquely allocates to the UE. Accordingly, the random access procedure may be performed without contention with other UEs.

Hereinafter, description will be given of the RRC state of the UE. If an RRC connection is established between the RRC layer of the UE and the RRC layer of a wireless network, the UE is in the RRC_CONNECTED state. Otherwise, the UE is in the RRC_IDLE state. The RRC state refers to a state in which the RRC of the UE is or is not logically connected with the RRC of the E-UTRAN. The RRC state of the UE having a logical connection with the RRC of the E-UTRAN is referred to as an RRC_CONNECTED state. The RRC state of the UE which does not have a logical connection with the RRC of the E-UTRAN is referred to as an RRC_IDLE state. A UE in RRC_CONNECTED has a RRC connection, and thus the E-UTRAN may recognize presence of the UE in a cell unit. Accordingly, the UE may be efficiently controlled. On the other hand, the E-UTRAN cannot recognize presence of a UE which is in RRC_IDLE. The UE in RRC_IDLE is managed by a core network in a tracking area (TA) which is an area unit larger than the cell. That is, for the UE in RRC_IDLE, only presence or absence of the UE is recognized in an area unit larger than the cell. In order for the UE in RRC_IDLE to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code, which is information broadcast from a cell. When the user initially turns on the UE, the UE searches for a proper cell first. Then, the UE establishes an RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish an RRC connection, does the UE establish an RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The RRC layer uses the RRC_IDLE state for PLMN selection, DRX configured by NAS, broadcast of system information, paging, cell re-selection. For a UE in RRC_IDLE, a UE specific DRX may be configured by NAS (not applicable for NB-IoT). The UE in RRC_IDLE can perform UE controlled mobility. The UE in RRC_IDLE monitors a paging channel to detect incoming calls, system information change, for earthquake and tsunami warning system (ETWS) capable UEs, ETWS notification, and for commercial mobility alert service (CMAS) capable UEs, CMAS notification, performs neighboring cell measurements and cell (re-)selection, acquires system information, performs logging of available measurements together with location and time for logged measurement configured UEs. No RRC context stored in the eNB (except for a UE that supports user plane CIoT EPS optimizations where a context may be stored for the resume procedure), sidelink communication transmission and reception, and/or sidelink discovery announcement and monitoring.

A UE in RRC_CONNECTED has an E-UTRAN-RRC connection and context in E-UTRAN. A UE in RRC_CONNECTED can perform network controlled mobility (handover and inter-RAT cell change order to GERAN with NACC), neighbor cell measurements. E-UTRAN knows the cell which the UE in RRC_CONNECTED belongs to, sidelink communication transmission and reception, and sidelink discovery announcement and monitoring. The network can transmit and/or receive data to/from the UE in RRC_CONNECTED. At PDCP/RLC/MAC level, the UE in RRC_CONNECTED can transmit and/or receive data to/from the network; monitors control signaling channel for shared data channel to see if any transmission over the shared data channel has been allocated to the UE; reports channel quality information and feedback information to the eNB. In RRC_CONNECTED, a DRX period can be configured according to the UE activity level for the UE power saving and efficient resource utilization under control of the eNB. The UE in RRC_CONNECTED monitors a paging channel and/or system information block type 1 contents to detect system information change, for ETWS capable UEs, ETWS notification, and for CMAS capable UEs, CMAS notification (not applicable for NB-IoT); monitors control channels associated with the shared data channel to determine if data is scheduled to it; provides channel quality and feedback information (not applicable for NB-IoT); performs neighboring cell measurements and measurements reporting (not applicable for NB-IoT); and acquires system information. Referring to 3GPP TS 36.331, upon leaving RRC_CONNECTED, the UE shall:

1> reset MAC;

1> stop all timers that are running except T320, T325 and T330;

1> if leaving RRC_CONNECTED was triggered by suspension of the RRC:

2> re-establish RLC entities for all SRBs and DRBs;

2> store the UE AS Context including the current RRC configuration, the current security context, the PDCP state including ROHC state, C-RNTI used in the source PCell, the cellIdentity and the physical cell identity of the source PCell;

2> store the following information provided by E-UTRAN:

3> the resumeIdentity;

2> suspend all SRB(s) and DRB(s);

2> indicate the suspension of the RRC connection to upper layers;

1> else:

2> release all radio resources, including release of the RLC entity, the MAC configuration and the associated PDCP entity for all established RBs;

2> indicate the release of the RRC connection to upper layers together with the release cause;

1> if leaving RRC_CONNECTED was triggered neither by reception of the MobilityFromEUTRACommand message nor by selecting an inter-RAT cell while T311 was running:

2> if timer T350 is configured:

3> start timer T350;

3> apply rclwi-Configuration if configured, otherwise apply the wlan-Id-List corresponding to the RPLMN included in SystemInformationBlockType17;

2> else:

3> release the wlan-OffloadConfigDedicated, if received;

3> if the wlan-OffloadConfigCommon corresponding to the RPLMN is broadcast by the cell:

4> apply the wlan-OffloadConfigCommon corresponding to the RPLMN included in SystemInformationBlockType17;

4> apply steerToWLAN if configured, otherwise apply the wlan-Id-List corresponding to the RPLMN included in SystemInformationBlockType17;

2> enter RRC_IDLE and perform procedures as specified in 3GPP TS 36.304;

1> else:

2> release the wlan-OffloadConfigDedicated, if received;

1> indicate the release of LWA configuration, if configured, to upper layers;

1> release the LWIP configuration, if configured.

Referring to 3GPP TS 36.321, if a reset of the MAC entity is requested by upper layers (e.g. RRC layer), the MAC entity initializes Bj for each logical channel to zero; stops (if running) all timers; considers all timeAlignmentTimers as expired and perform the corresponding actions; sets the new data indicators (NDIs) for all uplink HARQ processes to the value 0; stops, if any, ongoing RACH procedure; discards explicitly signalled ra-PreambleIndex and ra-PRACH-MaskIndex, if any; flushes Msg3 buffer; cancels, if any, triggered Scheduling Request procedure; cancels, if any, triggered Buffer Status Reporting procedure; cancels, if any, triggered Power Headroom Reporting procedure; flushes the soft buffers for all DL HARQ processes; for each DL HARQ process, considers the next received transmission for a transport block (TB) as the very first transmission; releases, if any, Temporary C-RNTI.

In the legacy LTE system, the value for timeAlignmentTimer is provided via system information block type 2 (SIB2) containing radio resource configuration information that is common for all UEs, or via a RRC dedicated signaling. The value for timeAlignmentTimer is provided in number of subframes.

In RRC_CONNECTED, the eNB is responsible for maintaining the timing advance. Serving cells having UL to which the same timing advance applies (typically corresponding to the serving cells hosted by the same receiver) and using the same timing reference cell are grouped in a timing advance group (TAG). In other words, a TAG is a group of serving cells that is configured by RRC and that, for the cells with an UL configured, use the same timing reference cell and the same TA value. Each TAG contains at least one serving cell with configured uplink, and the mapping of each serving cell to a TAG is configured by RRC. In case of dual connectivity (DC), a TAG only includes cells that are associated to the same CG and the maximum number of TAG is 8. For the primary TAG (pTAG) the UE uses the PCell in a master cell group (MCG) and the PSCell in a secondary cell group (SCG) as timing reference. In a secondary TAG (sTAG), the UE may use any of the activated SCells of this TAG as a timing reference cell, but should not change it unless necessary. In some cases (e.g. during DRX), the timing advance is not necessarily always maintained and the MAC sublayer knows if the L1 is synchronised and which procedure to use to start transmitting in the uplink. As long as the L1 is non-synchronised, uplink transmission can only take place on PRACH. For a TAG, cases where the UL synchronisation status moves from "synchronised" to "non-synchronised" include expiration of a timer specific to the TAG, and non-synchronised handover. The MAC entity has a configurable timer timeAlignmentTimer per timing advance group (TAG). The timeAlignmentTimer is used to control how long the MAC entity considers the serving cells belonging to the associated TAG to be uplink time aligned. The value of the timer associated to the pTAG of MCG is either UE specific and managed through dedicated signalling between the UE and the eNB, or cell specific and indicated via broadcast information. In both cases, the timer is normally restarted whenever a new timing advance is given by the eNB for the pTAG. The value of the timer associated to a pTAG of SCG and the value of a timer associated to an sTAG of an MCG or an sTAG of SCG are managed through dedicated signalling between the UE and the eNB, and the timers associated to these TAGs can be configured with different values. The timers of these TAGs are normally restarted whenever a new timing advance is given by the eNB for the corresponding TAG.

When a timing advance command MAC control element is received, the MAC entity applies the timing advance command for the indicated TAG; and starts or restarts the timeAlignmentTimer associated with the indicated TAG. In other words, when a timing advance MAC control element is received, the MAC entity adjusts the subframe boundary according to the timing advance command for the indicated TAG, and starts or restarts the timeAlignmentTimer associated with the indicated TAG. The timing advance command (TAC) MAC control element (CE) contains a TAG identity and a timing advance command The TAG identity indicates the TAG identity of the addressed TAG. The timing advance command in the TAC MAC CE indicates the index value $T_A$ used to control the amount of timing adjustment that the MAC entity has to apply.

Upon reception of a timing advance command for a TAG containing the primary cell or PSCell, the UE adjusts uplink transmission timing for PUCCH/PUSCH/SRS of the primary cell or PSCell based on the received timing advance command The timing advance command for a TAG indicates the change of the uplink timing relative to the current uplink timing for the TAG as multiples of 16 $T_s$, where $T_s$ is a basic time unit. In the legacy LTE system, $T_s=1/(15000*2048)$ seconds, normally. In case of random access response, an 11-bit timing advance command, $T_A$, for a TAG indicates $N_{TA}$ values by index values of $T_A=0, 1, 2, \ldots, 256$ if the UE is configured with a SCG, and $T_A=0, 1, 2, \ldots, 1282$ otherwise, where an amount of the time alignment for the TAG is given by $N_{TA}=T_A*16$. $N_{TA}$ is a timing offset between uplink and downlink radio frames at the UE, expressed in units of T. In other cases, a 6-bit timing advance command, $T_A$, for a TAG indicates adjustment of the current $N_{TA}$ value, $N_{TA,old}$, to the new $N_{TA}$ value, $N_{TA,new}$, by index values of $T_A=0, 1, 2, \ldots, 63$, where $N_{TA,new}=N_{TA,old}+(T_A-31)*16$. Here, adjustment of $T_A$ value by a positive or a negative amount indicates advancing or delaying the uplink transmission timing for the TAG by a given amount respectively. For a timing advance command received on subframe n, the corresponding adjustment of the uplink transmission timing applies from the beginning of subframe n+6. Transmission of the uplink radio frame i from the UE shall start $(N_{TA}+N_{TAoffset})*T_s$ seconds before the start of the corresponding downlink radio frame at the UE, where $0\leq N_{TA}\leq 4096$ if the UE is configured with a secondary cell group (SCG) and $0\leq N_{TA}\leq 20512$ otherwise. $N_{TAoffset}$ is a fixed timing advance offset, expressed in units of $T_s$ (see 3GPP TS 36.211).

When a timeAlignmentTimer expires, if the timeAlignmentTimer is associated with the pTAG, the MAC entity flushes all HARQ buffers for all serving cells; notifies RRC to release PUCCH for all serving cells; notifies RRC to release SRS for all serving cells; clears any configured downlink assignments and uplink grants; considers all running timeAlignmentTimers as expired. When a timeAlignmentTimer expires, if the timeAlignmentTimer is associated with an sTAG, then for all serving cells belonging to this TAG, the MAC entity flushes all HARQ buffers; notifies RRC to release SRS; and notifies RRC to release PUCCH, if configured.

When the MAC entity stops uplink transmissions for an SCell due to the fact that the maximum uplink transmission timing difference (as described in subclause 7.9.2 of 3GPP TS 36.133) or the maximum uplink transmission timing difference the UE can handle between TAGs of any MAC entity of the UE is exceeded, the MAC entity considers the timeAlignmentTimer associated with the SCell as expired. The MAC entity shall not perform any uplink transmission on a Serving Cell except the Random Access Preamble transmission when the timeAlignmentTimer associated with the TAG to which this serving cell belongs is not running Furthermore, when the timeAlignmentTimer associated with the pTAG is not running, the MAC entity shall not perform any uplink transmission on any serving cell except the random access preamble transmission on the SpCell. The MAC entity shall not perform any sidelink transmission which is performed based on UL timing of the corresponding serving cell and any associated SCI transmissions when the corresponding timeAlignmentTimer is not running A MAC entity stores or maintains $N_{TA}$ upon expiry of associated timeAlignmentTimer, where $N_{TA}$ is defined in 3GPP TS 36.211. The MAC entity applies a received timing advance command MAC control element and starts associated timeAlignmentTimer also when the timeAlignmentTimer is not running.

In order to transmit on the UL-SCH the MAC entity must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Work has started in ITU and 3GPP to develop requirements and specifications for new radio systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for the new RAT (NR) System (also referred to as 5G new RAT). It is required to identify and develop the technology components needed for successfully standardizing the NR system timely satisfying both the urgent market needs, and the more long-term requirements set forth by the ITU-R IMT-2020 process. In order to achieve this, evolutions of the radio interface as well as radio network architecture have to be considered in the "New Radio Access Technology."

In 5G New RAT, a new state, called RRC_INACTIVE, is introduced in addition to RRC_IDLE and RRC_CONNECTED. The benefit of keeping UE in RRC_INACTIVE is as follows:

as the UE context is stored in the radio access network (RAN), the core network (CN) signaling could be reduced when RRC connection is established;

as the UE is tracked in RAN level, the paging overhead could be reduced;

as the UE is configured with DRX similar to RRC_IDLE, the UE power consumption could be reduced.

To fully enjoy the benefit of the RRC_INACTIVE, however, it is required that the UE should be able to transmit small data in the RRC_INACTIVE state without state transition to the RRC_CONNECTED state. The state transition to RRC_CONNECTED requires couple of handshakes of RRC messages, which consumes much radio resource and UE power. Moreover, if the UE is kept in RRC_CONNECTED, the UE consumes more power than RRC_INACTIVE because the connected mode DRX is less power efficient than idle (or inactive) mode DRX. Accordingly, in this RRC_INACTIVE state, the UE may need to transmit UL data using contention based UL grant (hereinafter, CB-grant). For the UE to perform UL transmission, the UE must have valid uplink timing. If the UL transmission timing is de-synchronized between UE and eNB, this UE's UL transmitted data would act as interference to other UEs, and this UE's UL data as well as other UE's data would not be correctly received by the eNB. The UL transmission timing is controlled by a timer, called TimeAlignmentTimer (TAT). While the TAT is running, the UE considers that the UL timing is synchronized, and can perform UL transmission. However, if the TAT is not running, the UE considers that the UL timing is not synchronized, and the UE has to perform an random access (RA) procedure before performing UL transmission. During the RA procedure, the UE can acquire UL timing by a timing advance command (TAC) included in a random access response message. In the current LTE, when the UE leaves RRC_CONNECTED, the UE resets MAC. If the MAC is reset, the TAT expires at the UE. Therefore, there is no running TAT if the UE is not in RRC_CONNECTED, and the UE cannot perform UL transmission. In order to solving these problems, the following method is proposed.

For the UE to perform UL transmission in other state than RRC_CONNECTED (i.e. RRC_INACTIVE or RRC_IDLE), the present invention proposes that the UE maintain another TimeAlignmentTimer (hereinafter, I-TAT), which is used in other state than RRC_CONNECTED, and perform UL transmission in other state than RRC_CONNECTED if the I-TAT is running In other words, while the I-TAT is running, the UE in other state than RRC_CONNECTED considers that the UL timing is synchronized, and can perform UL transmission. If the I-TAT is not running, the UE in other state than RRC_CONNECTED does not perform UL transmission but performs a random access procedure to acquire UL transmission timing before performing UL transmission.

In the present invention, a UE may maintain an I-TAT for RRC_INACTIVE only, an I-TAT for RRC_IDLE only, an I-TAT for RRC_INACTIVE and RRC_IDLE both, or one for RRC_IDLE and one for RRC IDLE.

The UE may receive the value of I-TAT from the eNB via system information, dedicated RRC signaling, or MAC control element. The UE may receive the value of I-TAT from the eNB when the UE leaves RRC_CONNECTED, when the UE enters RRC_CONNECTED, when the UE is in RRC_CONNECTED, when the UE enters RRC_INACTIVE, or when the UE enters RRC_IDLE.

In the legacy LTE system, a UE stops or terminates timers used in RRC_CONNECTED when the UE leaves RRC_CONNECTED. On the contrary to the legacy LTE system, in the present invention, a UE starts the I-TAT when the UE leaves RRC_CONNECTED, when the UE enters RRC_INACTIVE, when the UE enters RRC_IDLE, when the UE resets MAC, or when the UE receives an indication to start I-TAT from the eNB via system information or RRC/PDCP/RLC/MAC signaling. The indication may be a timing advance command.

The UE restarts the I-TAT when the UE receives an indication to restart I-TAT from the eNB via system information or RRC/PDCP/RLC/MAC signaling. The indication may be a timing advance command.

The UE stops the I-TAT or the I-TAT expires, when the UE enters RRC_CONNECTED, when the UE leaves RRC_INACTIVE, or when the UE leaves RRC_IDLE.

When the I-TAT expires, the UE may consider that UL timing is de-synchronized, may not perform UL transmission, may release configured UL grant that can be used for UL transmission in RRC_INACTIVE or RRC_IDLE, and/or flush all HARQ buffers for all serving cells.

Figure 6:
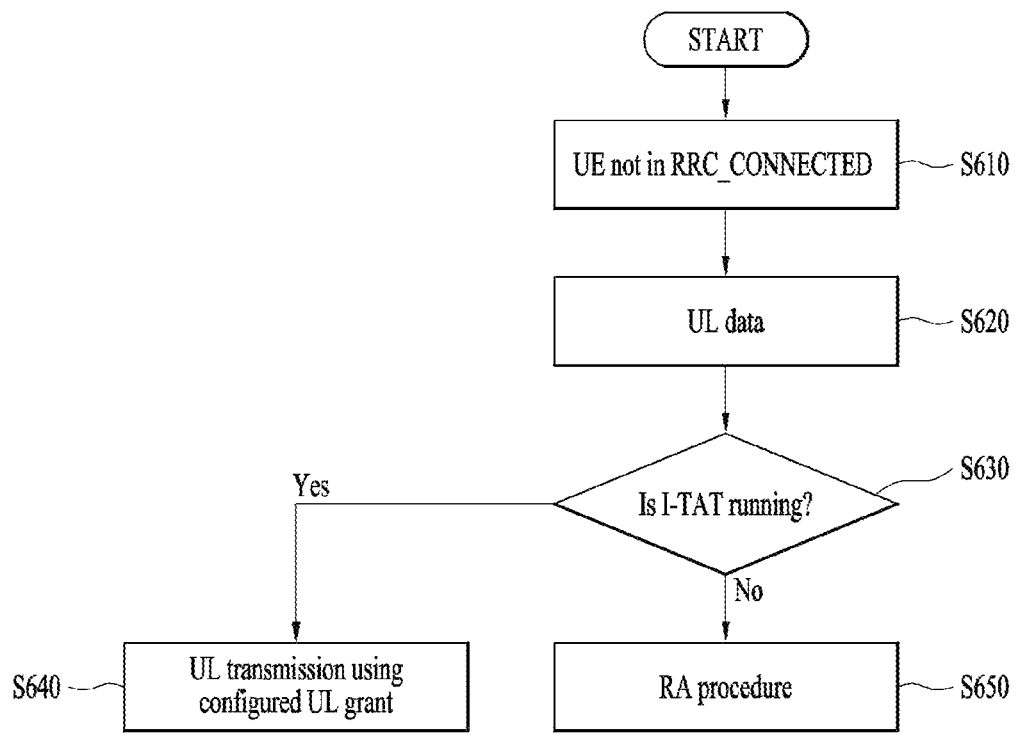
FIG. 6 is a flow diagram showing an example of UL data transmission according to the present invention.

FIG. 6 is a flow diagram showing an example of UL data transmission according to the present invention.

When an UL data arrives (S620) at the UE in RRC_INACTIVE or RRC_IDLE (S610), the UE checks whether the I-TAT is running (S630). In other words, if the UL data becomes available for transmission when the UE is not in RRC_CONNECTED, the UE checks whether the I-TAT is running.

If the I-TAT is running (S630, Yes), the UE performs UL transmission using the configured UL grant that can be used for UL transmission in RRC_INACTIVE or RRC_IDLE (S640). The configured UL grant is either contention based or dedicated. The UE may transmit the UE identity (ID) together with the UL data.

If the I-TAT is not running (S630, No), the UE considers that UL transmission is not allowed, and initiates an RA procedure (S650). During the RA procedure, the UE receives a timing advance command (TAC) in a random access response message. If the RA procedure is successfully completed, the UE applies the TAC received in the RAR to the I-TAT and starts the I-TAT. Then, as the I-TAT is running, the UE performs UL transmission using the configured UL grant that can be used for UL transmission in RRC_INACTIVE or RRC_IDLE.

The TAT used in RRC_CONNECTED may be reused as the I-TAT of the present invention.

The I-TAT of the present invention and the TAT used in RRC_CONNECTED may be configured separately. A UE in RRC_INACTIVE can be tracked in RAN level, and this means that UE does not move much. Considering this, the value for I-TAT may be configured larger than the value for the TAT used in RRC_CONNECTED.

In the present invention, a UE in RRC_IDLE or RRC_INACTIVE can perform UL transmission without the RA procedure if the I-TAT is running Accordingly, radio resources are more effectively managed in RRC_IDLE or RRC_INACTIVE, and more effective UE power saving is achieved.

The present invention is different from the control plane CIoT EPS optimization in that a UE of the present invention can perform UL transmission in RRC_IDLE or RRC_INACTIVE without the RA procedure if the I-TAT is running, whereas a UE using the control plane CIoT EPS optimization has to perform at least part of the RA procedure to perform UL transmission since UL user data can be transmitted first through a NAS PDU in a RRC connection setup complete message according to the control plane CIoT EPS optimization.

Figure 7:
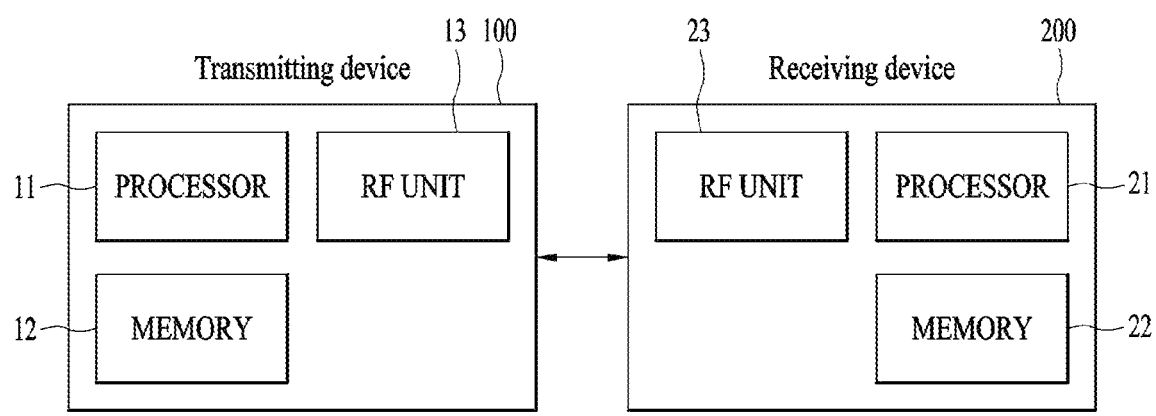
FIG. 7 is a block diagram illustrating elements of a transmitting device 100 and a receiving device 200 for implementing the present invention.

FIG. 7 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The UE processor according to present invention may control the UE RF unit to receive an UL grant that can be used while the UE is not in RRC_CONNECTED state. The UE processor may control the UE RF unit to receive a message indicating to leave RRC_CONNECTED state. If the UE RF unit receives a message indicating to leave RRC_CONNECTED state, the UE processor may start a time alignment timer (I-TAT) when the UE leaves RRC_CONNECTED state. The UE processor may control the UL RF unit to transmit UL data using the UL grant if the UL data becomes available for transmission when the UE is not in RRC_CONNECTED state and if the I-TAT is running If the UL data becomes available for transmission when the UE is not in RRC_CONNECTED state and if the I-TAT is not running, the UE processor may initiate an RA procedure to get UL synchronization. The UE processor may control the UE RF unit to receive an indication to restart the I-TAT via system information. If the UE RF unit receives the indication to restart the I-TAT, the UE may restart the I-TAT. the I-TAT may indicates a duration where the UE considers that UL timing is synchronized while the UE is not in RRC_CONNECTED state. UE's leaving RRC_CONNECTED state may mean UE's entering RRC_INACTIVE state. The UE processor may control the RF unit to transmit the UL data with an identity of the UE using the UL grant when the UE is not in RRC_CONNECTED state. The UE processor may stop the I-TAT when the UE enters RRC_CONNECTED state. The message may include a value for the time alignment timer (I-TAT).

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

The invention claimed is:

1. A method for transmitting, by a user equipment (UE), uplink (UL) signals in a wireless communication system, the method comprising:
   operating at least one first type time alignment timer associated with a timing advance group (TAG) which controls how long a medium access control (MAC) entity of the UE considers serving cells belonging to the TAG to be uplink time aligned while the UE is in radio resource control (RRC)_CONNECTED;
   receiving a configured grant,
   wherein the configured grant is dedicated to the UE and available while the UE is in RRC_INACTIVE;
   when the UE transitions from RRC_CONNECTED to RRC_INACTIVE,
   considering all first type time alignment timers as expired,
   receiving a value of a second type time alignment timer configured for RRC_INACTIVE, and
   starting the second type time alignment timer,
   wherein the second type time alignment timer controls how long the MAC entity considers uplink transmission for the configured grant to be uplink time aligned while the UE is in RRC_INACTIVE;
   performing, by the UE in RRC_INACTIVE, a UL data transmission using the configured grant, based on the second type time alignment timer running; and
   based on the UE transitioning from RRC_INACTIVE to RRC_CONNECTED:
   stopping the second type time alignment timer.

2. The method according to claim 1, wherein performing, by the UE in RRC_INACTIVE, the UL data transmission using the configured grant, based on the second type time alignment timer running comprises:
   performing the UL data transmission with an identity of the UE.

3. The method according to claim 1, further comprising:
   performing, by the UE, the UL data transmission based on a random access procedure, based on the second type time alignment timer not running.

4. A user equipment (UE) configured for transmitting uplink (UL) signals in a wireless communication system, the UE comprising:
   a radio frequency (RF) transceiver;
   a processor; and
   a memory storing at least one program that causes the processor to perform operations comprising:
   operating at least one first type time alignment timer associated with a timing advance group (TAG) which controls how long a medium access control (MAC) entity of the UE considers serving cells belonging to the TAG to be uplink time aligned while the UE is in radio resource control (RRC)_CONNECTED;
   receiving a configured grant,
   wherein the configured grant is dedicated to the UE and available while the UE is in RRC_INACTIVE;
   when the UE transitions from RRC_CONNECTED to RRC_INACTIVE,
   considering all first type time alignment timers as expired,
   receiving a value of a second type time alignment timer configured for RRC_INACTIVE, and
   starting the second type time alignment timer,
   wherein the second type time alignment timer controls how long the MAC entity considers uplink transmission for the configured grant to be uplink time aligned while the UE is in RRC_INACTIVE;
   performing, by the UE in RRC_INACTIVE, a UL data transmission over the configured grant, based on the second type time alignment timer running; and
   based on the UE transitioning from RRC_INACTIVE to RRC_CONNECTED:
   stopping the second type time alignment timer.

5. The UE according to claim 4, wherein performing, by the UE in RRC_INACTIVE, the UL data transmission using the configured grant, based on the second type time alignment timer running comprises:
   performing the UL data transmission with an identity of the UE.

6. The UE according to claim 4, wherein the operations further comprise:
   performing, by the UE, the UL data transmission based on a random access procedure, based on the second type time alignment timer not running.

7. A computer readable non-transitory storage medium storing at least one program that, when executed by at least one processor, causes the at least one processor to perform operations comprising:
   operating at least one first type time alignment timer associated with a timing advance group (TAG) which controls how long a medium access control (MAC) entity of a user equipment (UE) considers serving cells belonging to the TAG to be uplink time aligned while the UE is in radio resource control (RRC)_CONNECTED;
   receiving a configured grant,
   wherein the configured grant is dedicated to the UE and available while the UE is in RRC_INACTIVE;

when the UE transits from RRC_CONNECTED to RRC_INACTIVE,
considering all first type time alignment timers as expired,
receiving a value of a second type time alignment timer configured for RRC_INACTIVE, and
starting the second type time alignment timer,
wherein the second type time alignment timer controls how long the MAC entity considers uplink transmission for the configured grant to be uplink time aligned while the UE is in RRC_INACTIVE;
performing, by the UE in RRC_INACTIVE, a uplink (UL) data transmission using the configured grant, based on the second type time alignment timer running; and
based on the UE transitioning from RRC_INACTIVE to RRC_CONNECTED:
stopping the second type time alignment timer.

8. The computer readable non-transitory storage medium according to claim 7, wherein performing, by the UE in RRC_INACTIVE, the UL data transmission using the configured grant, based on the second type time alignment timer running comprises:
performing the UL data transmission with an identity of the UE.

9. The computer readable non-transitory storage medium according to claim 7, wherein the operations further comprise:
performing, by the UE, the UL data transmission based on a random access procedure, based on the second type time alignment timer not running.

* * * * *